United States Patent
Huang et al.

(10) Patent No.: US 12,166,745 B2
(45) Date of Patent: Dec. 10, 2024

(54) PERFORMANCE IMPROVEMENT FOR ENCRYPTED TRAFFIC OVER IPSEC

(71) Applicant: HEWLETT PACKARD ENTERPRISE DEVELOPMENT LP, Houston, TX (US)

(72) Inventors: Huimeng Huang, Beijing (CN); Jianpo Han, Beijing (CN); Qiwei Chang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 428 days.

(21) Appl. No.: 17/461,811

(22) Filed: Aug. 30, 2021

(65) Prior Publication Data
US 2023/0066604 A1 Mar. 2, 2023

(51) Int. Cl.
*H04L 9/40* (2022.01)

(52) U.S. Cl.
CPC ........ *H04L 63/0245* (2013.01); *H04L 63/029* (2013.01); *H04L 63/0435* (2013.01); *H04L 63/20* (2013.01)

(58) Field of Classification Search
CPC ... H04L 63/20; H04L 63/0245; H04L 63/029; H04L 63/0435; H04L 9/0618; H04L 9/0894; H04L 9/40
See application file for complete search history.

(56) References Cited

U.S. PATENT DOCUMENTS

| | | | |
|---|---|---|---|
| 7,165,175 B1 | 1/2007 | Kollmyer et al. | |
| 9,712,504 B2 | 7/2017 | Kurmala et al. | |
| 10,637,839 B2 * | 4/2020 | Tola, Jr. | H04L 63/0421 |
| 2014/0269371 A1 * | 9/2014 | Badea | H04L 43/0858 |
| | | | 370/252 |
| 2018/0337889 A1 * | 11/2018 | Panchapakesan | H04L 9/14 |
| 2019/0230125 A1 | 7/2019 | Lee et al. | |
| 2020/0119903 A1 * | 4/2020 | Thomas | H04L 9/0637 |
| 2020/0186507 A1 | 6/2020 | Dhanabalan et al. | |
| 2021/0021579 A1 * | 1/2021 | Thorslund | H04L 63/0464 |
| 2021/0329347 A1 * | 10/2021 | Chan | H04N 21/4405 |
| 2022/0353247 A1 * | 11/2022 | Bastos | H04L 63/0428 |

FOREIGN PATENT DOCUMENTS

WO WO-2021016015 A1 1/2021

OTHER PUBLICATIONS

Data-image-video encryption M Yang, N Bourbakis, S Li—IEEE potentials, 2004, https://ieeexplore.ieee.org/stamp/stamp.jsp?tp=&arnumber=1341784 (Year: 2004).*

* cited by examiner

*Primary Examiner* — Farid Homayounmehr
*Assistant Examiner* — Brian William Avery
(74) *Attorney, Agent, or Firm* — Sheppard Mullin Richter & Hampton LLP

(57) ABSTRACT

A packet that includes a header and a payload can be acquired. A first portion of the payload can be selected such that the first portion that is smaller than the payload. The header and the first portion of the payload can be encrypted based on an encryption algorithm to generate an encrypted packet. The encrypted packet can be transmitted to a node on a network.

12 Claims, 8 Drawing Sheets

PERFORMANCE IMPROVEMENT FOR ENCRYPTED TRAFFIC OVER IPSEC

BACKGROUND

Users who work from locations other than a primary campus, headquarters facility, or large regional office are called "remote users." Remote users typically work from home offices, small satellite offices, medium-sized branch offices, on the road from hotels, hot spots, or customer locations. IT organizations traditionally have served remote users using various remote network architectures. For instance, telecommuters with only a single PC or laptop could be served with a software virtual private network (VPN) client. However, individual connections through the software VPN can be cumbersome to configure. Thus, it may be preferable for network administrators to instead set up an AP as a remote access point (AP) or a microbranch AP that can provide multiple connections to a core network at the primary campus, headquarters facility, or large regional offices for the remote users. The AP can interconnect an IP subnet at a remote site to the core network. The AP may secure the connections for the remote users by setting up IPSec tunnels between the remote site and the core network and encrypting network traffic (e.g., packets) passing to and from the AP.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
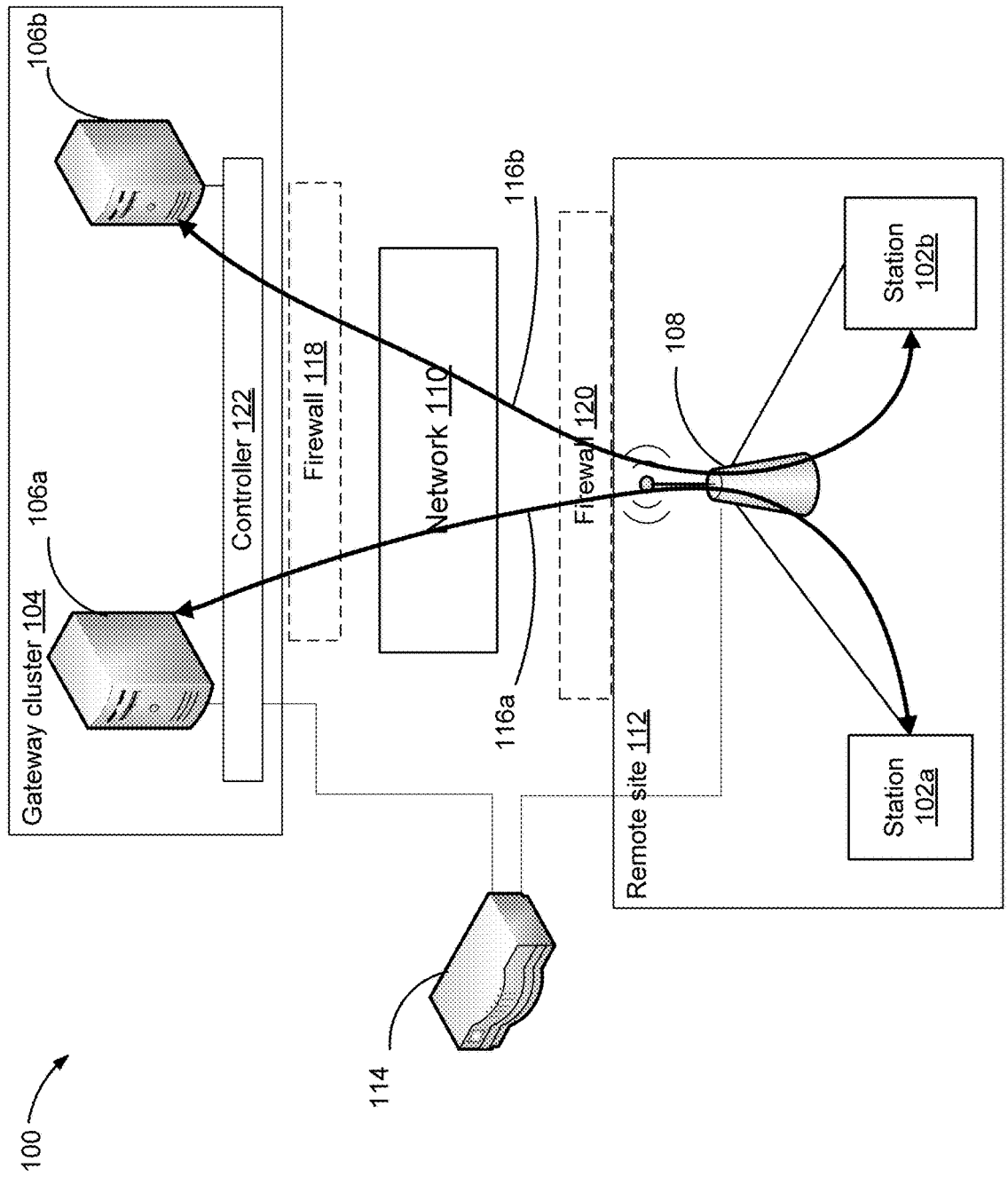
FIG. 1 illustrates an example wireless network deployment in which IPSec tunnels can be implemented in accordance with various embodiments.

The figures are not exhaustive and do not limit the present disclosure to the precise form disclosed.

DETAILED DESCRIPTION

As more and more people work from home and network infrastructures are migrated to cloud platforms, greater performance and capacity are required of IP security (IPSec). In remote AP deployment and microbranch AP deployments, a remote AP or a microbranch AP can set up one or more IPSec tunnels with a controller. Uplink/downlink network traffic can be sent through the IPSec tunnel. Traditionally, the IPSec tunnels have secured network traffic with encapsulating security payload (ESP) encryption. An IPSec tunnel allows for the implementation of a virtual private network (VPN) an enterprise may use to securely extend its reach beyond its own network to customers, partners, and suppliers by requiring and providing full encryption of network traffic (e.g., packets) through the IPSec tunnel, such as by using ESP encryption. However, traditional methodologies of encrypting the entire IP packet using the ESP encryption is time and resource intensive.

Generational change of faster transmission rate standards has shifted a bottleneck in secure communications from transmission rates to encryption performance. For instance, transmission rates have reached upwards of approximately 9.6 Gbps in IEEE 802.11 ax. However, computing power of a processor or crypto engine of embedded devices (e.g., a remote AP or a microbranch AP) used to provide ESP encryption remain mostly the same. A controller at a site (e.g., core network) or a cloud environment must process huge ESP data from massive number of IPSec tunnels in parallel, and thus, often cannot transmit and receive network traffic at the faster transmission rates because of the limited computing power.

Prior solutions introduced single IPsec encryption to address the bottleneck. The single IPsec encryption adds a fake IPsec header before packet instead of performing real IPsec encryption. The single IPsec encryption can provide acceptable level of security in a campus scenario where the packet is not sent over the Internet. However, in scenarios involving a remote AP or a microbranch AP, it is desirable that packets are properly encrypted (i.e., not use the single IPsec encryption that only adds the fake IP header) since transmitting the data in contexts other than the campus scenario may invite increased security risk. For instance, the Internet environment is not controlled and is known to be not as safe compared to the campus scenario.

Thus, conventional approaches fail to provide adequate means of addressing the shifted bottleneck as they do not offer encryption that is faster yet equally (or substantially equally) secure. Examples disclosed herein address these technical issues by significantly improving encryption performance for network traffic over IPSec tunnels. Instead of engaging in encryption of whole payload, the disclosed technologies can encrypt one or more portions of whole payload to save computing resources used by encryption algorithms. Thus, the disclosed technologies can help avoid bottlenecks caused by encryption performance and improve throughput of encrypted network traffic.

FIG. 1 illustrates an example wireless network deployment 100 in which one or more Internet Protocol Security (IPSec) tunnels 116a, 116b can be implemented in accordance with various embodiments. The example wireless network deployment 100 illustrates an example of a configuration in which stations 102a, 102b are connected to a gateway cluster 104 comprising gateways 106a, 106b via an AP 108 over a network 110. The gateway cluster 104 may be associated with at least one controller 122 that provides a public IP address to which the AP 108 can connect by forming the IPSec tunnels 116a, 116b. More details will follow with respect to a tunnel management module 204 of FIG. 2 below.

Stations 102*a*, 102*b* can refer to a device including a processor, memory, and I/O interfaces for wired and/or wireless communication. Examples of stations 102*a*, 102*b* may include: desktop computers, laptop computers, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, or other client devices. The stations 102*a*, 102*b* can connect to the gateway cluster 104 via the AP 108 which can be deployed at a remote site (e.g., a branch site) 112 acting as a remote AP or a microbranch AP. The remote site 112 can be home offices, small branch offices, retail locations, and so on.

The gateway cluster 104 can include one or more gateways 106*a*, 106*b* operating as a single entity to provide high availability and service continuity to the AP 108 over the network 110. A gateway 106*a*, 106*b* can be a network node that serves to connect a network to another network. The gateway 106*a*, 106*b* can be a physical gateway or a virtual gateway implemented as a part of a Software-Defined Networking (SDN). The gateway cluster 104 can provide full redundancy of gateways 106*a*, 106*b* to APs, including the AP 108, and the stations 102*a*, 102*b* in the event of a failover.

The AP 108 at the remote site 112 can be configured and managed by a portal 114. The portal 114 can be a web-based platform (e.g., Aruba Central platform) that collects information from different sources into a user interface and presents users (e.g., network administrators) with the collected information for viewing or editing. For instance, network administrators can access the portal 114 to configure or set up various components and network topologies of the example wireless network deployment 100. The portal 114 can be on a cloud or be a part of a cloud platform. The portal 114 can configure, set up, or be used to configure or set up the AP 108 in the remote site 112 and enable the AP 108 to form the IPSec tunnels 116*a*, 116*b* to the gateway cluster 104. For instance, the portal 114 may provide tunnel orchestration service that automates formation of the IPSec tunnels 116*a*, 116*b* between the AP 108 and the gateway cluster 104. The IPSec tunnels 116*a*, 116*b* can provide encapsulated data traffic and/or control traffic over the IPSec tunnels 116*a*, 116*b* between the gateway cluster 104 and the stations 102*a*, 102*b*.

The IPSec tunnels 116*a*, 116*b* can be configured in various modes including a full tunnel mode and a split tunnel mode. In the full tunnel mode, a data center associated with the gateway cluster 104 can provide a Dynamic Host Configuration Protocol (DHCP) server that assigns IP addresses to the stations 102*a*, 102*b*. Further, rules to firewalls 118, 120 can be applied from the AP 108, the gateway cluster 104, or both. In the split tunnel mode, the portal 114 can configure the AP 108 such that certain domain traffic (e.g., corporate traffic, VPN traffic, LAN traffic, or the like) can be forwarded to the gateway cluster 104 using tunnels and non-domain traffic can be forwarded to WAN (e.g., Internet) without the use of the tunnels.

The example wireless network deployment 100 illustrates two gateways 106*a*, 106*b* in the gateway cluster 104, one AP 108, two IPSec tunnels 106*a*, 106*b*, one portal 114, two firewalls 118, 120, and two stations 102*a*, 102*b*. In practice, any number of gateways, AP, portal, firewall, stations are contemplated. Each of the gateways, AP, portal, firewall, stations, or the like is a node on the network 110.

Traditionally, network traffic between the AP 108 and the gateway cluster 104 over IPSec tunnels 106*a*, 106*b* are encrypted by a transmitter and decrypted by a receiver. IPSec encryption is time and computing power intensive. As alluded, IPSec has become the bottleneck in communications in many instances with advancements in wireless technology.

Figure 2:
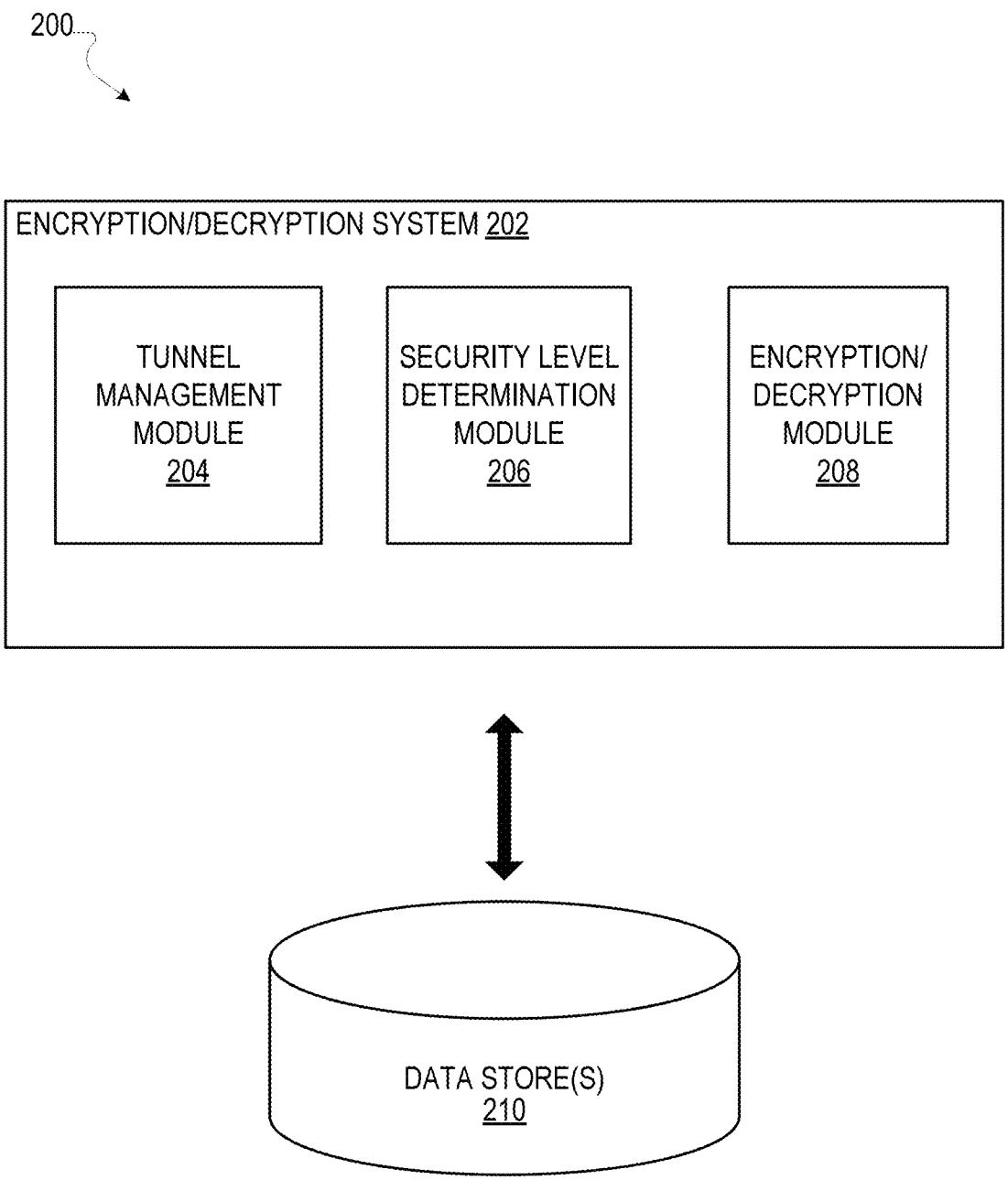
FIG. 2 illustrates a block diagram of an example encryption/decryption system which can implement improved encryption/decryption for network traffic over IPSec tunnels in accordance with various embodiments.

FIG. 2 illustrates a block diagram 200 of an example encryption/decryption system 202 which can implement improved encryption for network traffic over IPSec tunnels in accordance with various embodiments. The encryption/decryption system 202 can be implemented on an AP (e.g., the AP 108 of FIG. 1). Further, the AP can be a virtual AP (VAP) which can be logical entities that are present within a physical AP. The encryption/decryption system 202 can include a tunnel management module 204, a security level determination module 206, and an encryption/decryption module 208. A module can be a component or part of a software program or hardware device that is capable of executing one or more routines, functions, or features. The encryption/decryption system 202 can provide various functions relating to providing faster and/or more secure encryption for network traffic transmitted between one or more stations (e.g., the stations 102*a*, 102*b* of FIG. 1) and a gateway cluster (e.g., the gateway cluster 104 of FIG. 1). The modules in this figure and all figures herein are exemplary only, and other implementations may include additional, fewer, integrated or different components. Some modules may not be shown so as not to obscure relevant details.

In some embodiments, the various modules and/or applications described herein can be implemented, in part or in whole, as software, hardware, or any combination thereof. For example, the various modules and/or applications described herein can be implemented on a computing component 700 of FIG. 7. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a network computing device or on a server. For example, one or more modules and/or applications described herein, or at least a portion thereof, can be implemented as or within an application (e.g., app), a program, or an applet, etc., running on a network computing device or system. The network computing device or system can be one or more hubs, APs, repeaters, bridges, switches, routers, gateways, or the like. In another example, one or more modules and/or applications, or at least a portion thereof, can be implemented using one or more computing devices or systems that include one or more servers, such as network servers or cloud servers. It should be understood that there can be many variations or other possibilities.

The tunnel management module 204 can be configured to generate one or more tunnels. Specifically, the tunnel management module 204 can generate one or more IPSec tunnels (the IPSec tunnels 106*a*, 106*b* of FIG. 1). The AP can initiate an IPSec connection to a specified public IP address provided by the controller over any public network. This connection may be analogous to a software VPN connection initiated by a VPN client on a station. The AP can, instead of a single software VPN connection that authenticates a user, authenticate the AP itself to the controller so that multiple users connected to the AP are collectively authenticated when the users communicate through the AP. For instance, the AP may authenticate itself by using a preprovisioned user name and password or by using certificates installed on the AP. After the AP is authenticated, the controller can assign an IPSec tunnel to the AP. After the AP authentication is completed by the controller and the IPSec tunnel has been established, all communication between the controller and the AP may occur through the IPSec tunnel as secured (e.g., encrypted) network traffic. In some embodiments, the IPSec tunnel can be used to update AP configuration including security settings, firewall roles and policies, wired port policies, and wireless local area network (WLAN) policies. The AP configuration can control how the AP handles network traffic, including where and when encryption/decryption occurs as well as where and when firewall policies are applied. The AP configuration can specify a forwarding mode of the network traffic.

The security level determination module 206 can be configured to determine a desirable security level for network traffic that is to be forwarded to a node of a network. The desirable security level can be based on current security risk associated with the network traffic. For instance, the security level determination module 206 can determine that a payload of the network traffic is encrypted with DES that offers lower security level than 3DES and that at least a portion of the payload should be further encrypted with 3DES encryption algorithm before forwarding the network traffic to the node. In some embodiments, the security level determination module 206 can determine that a portion or the whole of a header should also be encrypted along with the portion to provide increased security for the network traffic. The desirable security level may be determined based on encryption algorithms or combination thereof.

In some instances, network traffic to be forwarded may already be encrypted in different layers (e.g., wireless layer, application layer, etc.) of open systems interconnection (OSI) model. For instance, for centralized forward mode, network traffic may already be encrypted in wireless layer. In the centralized forward mode, an AP can forward already encrypted 802.11 frames received from a station using a GRE (Generic Routing Encapsulation)/IPSec tunnel to a destination device. The AP does not need to convert the 802.11 frames to 802.3 frames.

As another instance, for decrypt centralized/bridge mode, packet (e.g., network traffic) may already be encrypted in application layer, such as packet encrypted as an HTTPs packet. In the decrypt centralized mode, an AP can decrypt and decapsulates 802.11 frames received from a station in data link layer and send corresponding 802.3 frames using a GRE/IPsec tunnel to a destination device. On the other hand, when the destination device, in turn, sends traffic to the station, the destination device can send 802.3 frames using the GRE/IPsec tunnel to the AP. The AP can then convert the 802.3 frames to data link layer-encrypted 802.11 frames and forward to the client. In the bridge mode, an AP can decrypt and decapsulate 802.11 frames received from a station in data link layer and send 802.3 frames to a local subnet of the AP without use of a GRE/IPSec tunnel between the AP and a destination device.

For the packets that are already encrypted (e.g., packets encrypted in wireless layer or application layer), further encryption of the whole packet (e.g., performing double encryption) by an AP or a controller can unnecessarily increase computing resource and time overheads without providing much, if at all, improvement in security. The security level determination module 206 can examine the forwarding mode associated with an IPSec tunnel through which the packet will be forwarded and/or the packet to determine a desirable security level for the packet. For instance, if an IPSec tunnel connects to a less secure node, then higher security level may be desired for packets forwarded via the IPSec tunnel. As another instance, if an IPSec tunnel connects to a highly secure node, then lower security level may be desirable to save on computing resources used to encrypt packets forwarded via the IPSec tunnel.

In some embodiments, the security level determination module 206 can determine an encryption scheme based on a desirable security level. The encryption scheme can specify a portion (e.g., a size of the portion as specifiable with a number of bytes or a percent-portion of the payload) of a payload of packet to encrypt, an encryption algorithm with which to encrypt the portion, etc. In some embodiments, the security level determination module 206 may make the examination and determination of the security level desirable for each packet. In some embodiments, the security level determination module 206 may make the examination and determination of the security level desirable for each IPSec tunnel. Many variations are possible.

The encryption/decryption module 208 can be configured to encrypt a packet according to an encryption scheme determined for the packet. The encryption/decryption module 208 can encrypt the packet according to the encryption scheme determined by the security level determination module 206. For instance, the security level determination module 206 can determine an encryption scheme that provides (i) encryption of a packet header instead of encrypting complete packet when a payload of the packet is already encrypted in application layer or wireless layer or (ii) encryption of the packet header and a portion of the payload (e.g., less than the whole payload). The encryption/decryption module 208 can generate one or more parameters or fields (e.g., an IP option field 434 of FIG. 4) that specifies the encryption scheme and include the one or more parameters or fields in a header of the encrypted packet. Many variations are possible and further described in relation to FIGS. 5A-5C and FIGS. 6A-6C. The encryption of the packet header or the packet header and a portion of a payload of a packet can conserve computing resources and time compared to traditional methods of encrypting the whole payload in instances when the payload is already encrypted in the application or wireless layer (e.g., double encryption).

When decrypting a packet received from another node (e.g., from a controller to an AP, from an AP to a controller, etc.), the encryption/decryption module 208 can be configured to determine an encryption scheme of the packet by examining the packet. For example, the encryption/decryption module 208 may determine encryption algorithm(s) and/or encrypted portion(s) by examining one or more parameters or fields (e.g., IP option field 434 of FIG. 4) within the packet. In some embodiments, the encryption/decryption module 208 may decrypt the packet according to the determined encryption algorithm(s) and encrypted portion(s).

As shown in FIG. 2, the encryption/decryption system 202 can be configured to communicate with the data store 210. The data store 210 can be configured to store and maintain various types of data to support the functionality of the encryption/decryption system 202. For example, the data store 210 can store and maintain an AP configuration, forwarding modes thereof, associations between the forwarding modes and encryption schemes, encryption algorithms, associations between IPSec tunnels and encryption schemes, or the like. In some embodiments, the data store 210 may store and maintain a mapping between encryption algorithms and their respective security levels and risks. Further, the data store 210 can maintain and provide various encryption/decryption algorithms. Accordingly, the data store 210 can support various functionalities of the tunnel management module 204, security level determination module 206, and encryption/decryption module 208.

Figure 3:
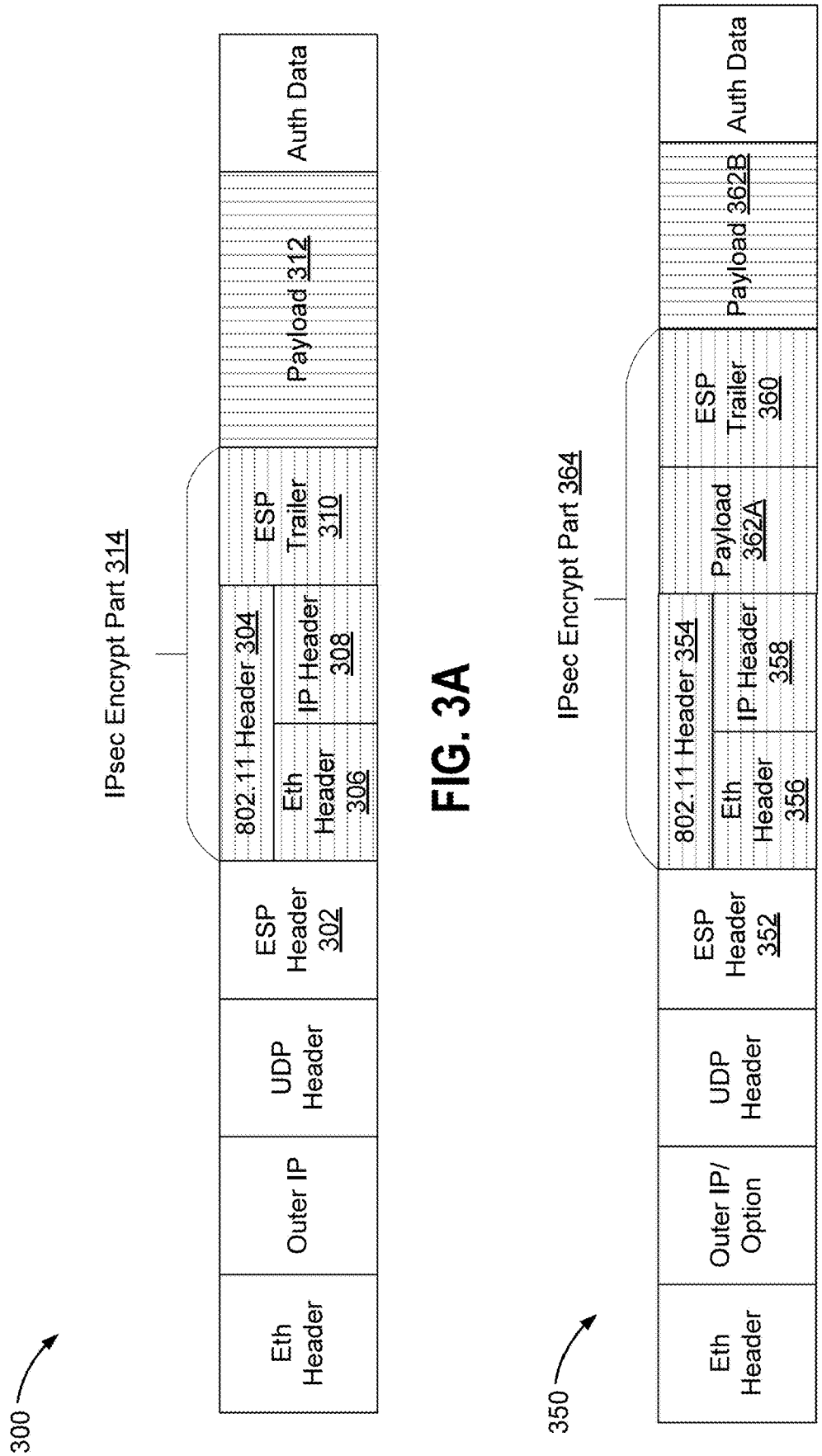
FIGS. 3A-3B illustrate example encrypted packets in accordance with various embodiments.

FIGS. 3A-3B illustrate example encrypted packets 300, 350 in accordance with various embodiments. Conventional encryption techniques rely on ESP protocol to surround a payload they are protecting. For instance, conventional encryption techniques (i) encrypt the entirety of an already encrypted payload (i.e., double encryption) or (ii) add a fake IPSec header (i.e., perform single IPSec encryption) instead of a performing real encryption on the payload. The former taxes computing resources and time constraints and the latter does not provide adequate security for the packet in the Internet. In contrast, based on the present disclosure, the example encrypted packet 300 can encrypt only a header of a payload. For instance, a IEEE 802.11 header 304 comprising an Ethernet header 306 and IP header 308 can be encrypted based on ESP. Thus, the example encrypted packet 300 illustrates encryption of the IEEE 802.11 header 304 which is distinct from the conventional approach that inserts a fake header without encryption. An ESP trailer 310 can be appended to the IEEE 802.11 header 304. Then an IPSec encrypt part 314 comprising the IEEE 802.11 header 304 and ESP trailer 310 can be encrypted collectively. An ESP header 302, which may not be encrypted, can provide information about the encrypted IPSec encrypt part 314. The example encrypted packet 300 and encryption method thereof can be advantageous when a payload 312 of the packet is already encrypted and provides reasonable security. For instance, the payload 312 may already have been encrypted with an application layer encryption, such as hypertext transfer protocol secure (HTTPS), secure shell protocol (SSH), or the like. In some embodiments, the encryption/decryption module 208 of FIG. 2 may provide the determination that the payload 312 is already encrypted with which layer encryption, which encryption algorithm, and/or with which level of security.

In the example encrypted packet 350, a header and a portion of a payload are encrypted. For instance, a IEEE 802.11 header 354 (comprising an Ethernet header 356 and IP header 358) and a first payload portion 362A can be encrypted based on ESP. An ESP trailer 360 can be appended after the first payload portion 362A. Then, an IPSec encrypt part 364 comprising the IEEE 802.11 header 304, first payload portion 362A, and ESP trailer 360 can be encrypted collectively. An ESP header 352, which may not be encrypted, can provide information about the encryption. The example encrypted packet 350 and encryption method thereof can be advantageous when the first payload portion 362A of the packet are not already encrypted or encrypted with lower security encryption. For instance, the payload portions 362A, 362B may have been encrypted with data link layer encryption, such as IEEE 802.11 Temporal Key Integrity Protocol (TKIP) encryption. In some embodiments, the encryption/decryption module 208 of FIG. 2 may provide the determination that the payload portions 362A, 362B are already encrypted with which layer encryption, which encryption algorithm, and/or with which level of security.

As illustrated in the example encrypted packets 300, 350, the system and methods disclosed herein allow for the protection of sensitive header information without need to encrypt the whole payload. The selective encryption can significantly reduce computing resource and time overheads associated with the conventional double encryption and, thus, provide performance improvement regarding securing network traffic over IPSec tunnels. In order to access whole plain data from encrypted packets, one must decrypt the encrypted part and combine the decrypted part with unencrypted payload. Thus, the example encrypted packets 300, 350 may provide the same level of security as compared to conventional double encryption but with reduced bottleneck and increased throughput.

Figure 4:
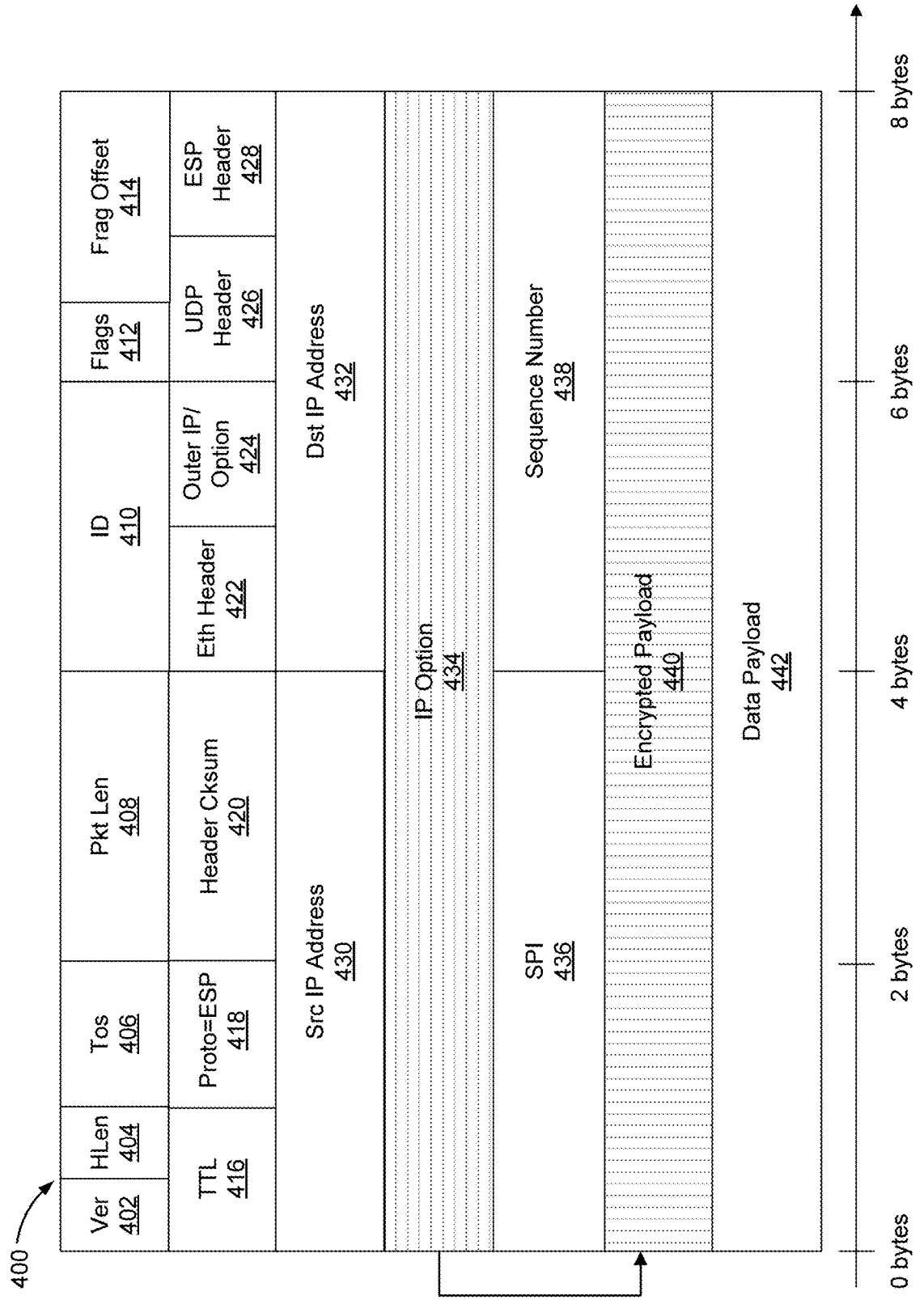
FIG. 4 is an example datagram that can be used for the improved encryption/decryption in accordance with various embodiment.

FIG. 4 is an example datagram 400 that can be used for the improved encryption/decryption in accordance with various embodiment. The example datagram 400 is but one representative datagram and various other datagrams with different data structures can be used. The example datagram 400 can encapsulate packets for transmission through IPSec tunnels. The example datagram 400 may comprise fields of IP version (Ver) 402, header length (HLen) 404, type of service (Tos) 406, total packet length (Pkt Len) 408, identification (ID) 410, flags 412, data fragment offset (Frag Offset) 414, time to live (TTL) 416, protocol 418 which may be configured as ESP protocol (i.e., Proto=ESP), header checksum (Header Cksum) 420, ethernet header (Eth Header) 422, outer IP/option 424, user datagram protocol (UDP) header 426, ESP header 428, source (Src) IP address 430, destination (Dst) IP address 432, IP option field 434, security parameter index (SPI) 436, sequence number 438, encrypted payload 440, and data payload 442. It is contemplated that the example datagram 400 can contain additional or fewer fields. Further, sizes of each field may be larger or smaller than depicted in the example datagram 400.

The IP option field 434 (i.e., IP option field) can be an optional part of the example datagram 400 that contains information pertaining to type(s) of encryption (e.g., one or more encryption algorithms), size(s) of encrypted portion(s) of payload(s), encryption key(s), or the like. Accordingly, the IP option field 434 can contain information about an encryption scheme used for the packet. In some embodiments, the presence of the IP option field 434 can be indicated by a different field, such as the HLen 404 having a value greater than 5 as defined in Request For Comment (RFC). The IP option field 434 field can vary in length. For instance, RFC specifies that the IP option field 434 contain an "option-length" octet (e.g., length fields 604, 624, 654 of FIGS. 6A-6C) that can indicate a size of option data. The option data can contain the information pertaining to the type(s) of encryption, size(s) of encrypted portion(s) of payload(s), encryption key(s), or the like.

As described with respect to the example encrypted packet 350 of FIG. 3B, a header and a portion of a payload (e.g., a partial payload) that is less than the whole payload can be encrypted. The partial payload can be encrypted according to parameters (e.g., parameters that describe an encryption scheme for the partial payload) in the IP option field 434. In some instances, the payload may have been encrypted already. In those instances, the partial payload can be additionally encrypted. The example datagram 400 illustrates an encrypted payload 440 followed by data payload 442. In some embodiments, the data payload 442 can be an already encrypted payload. In these embodiments, the encrypted payload 440 can be encrypted with another layer of encryption over the original encryption of the payload with the same or a different encryption. The IP option field 434 can contain information that describes such one or more layers of encryptions performed on the partial payload. The IP option field 434 can be inserted/appended to the packet before, during, or after the encryption to inform a receiving node of the encryption scheme. Example encryption schemes are provided with respect to FIGS. 5A-5C and example IP option datagrams describing IP option fields are provided with respect to FIGS. 6A-6C.

Figure 5A:
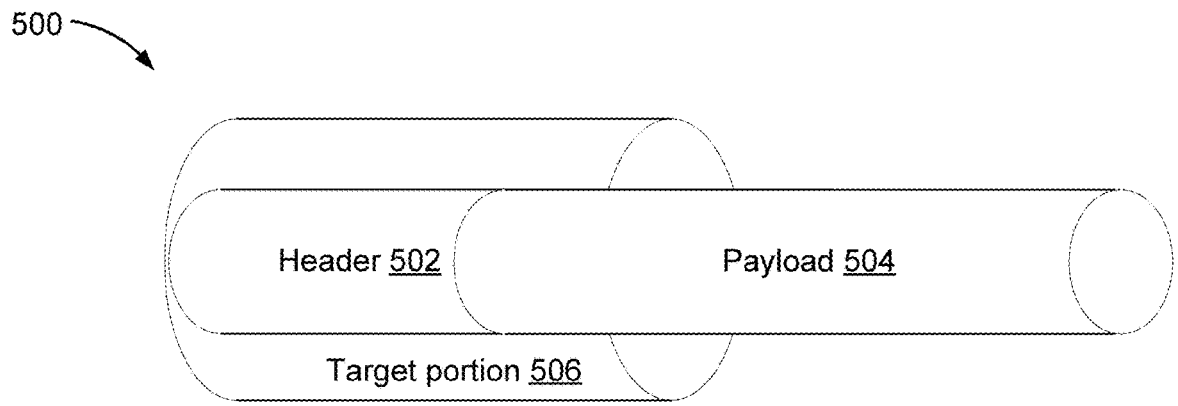
FIGS. 5A-5C illustrate example encryption schemes for the improved encryption/decryption in accordance with various embodiments.
Figure 5B:
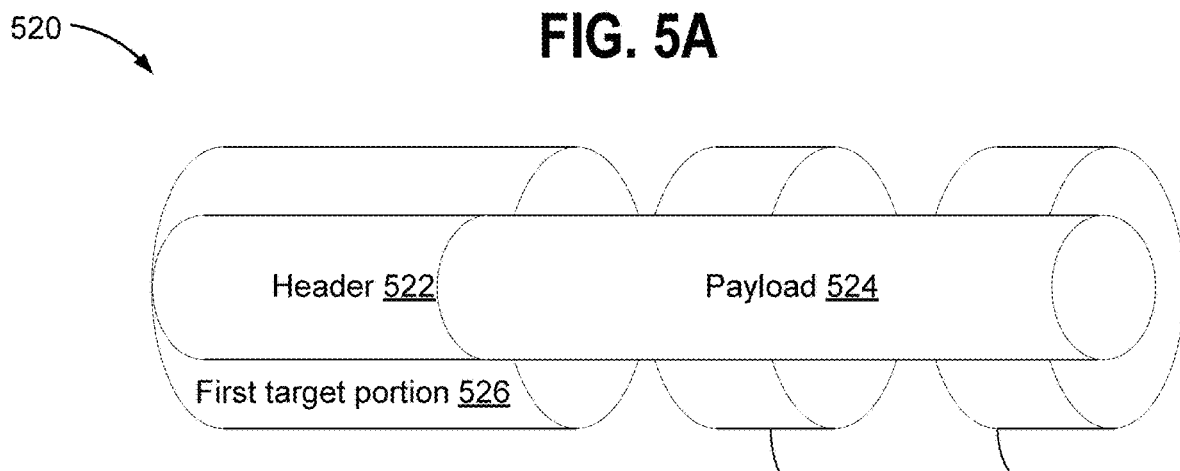
Figure 5C:
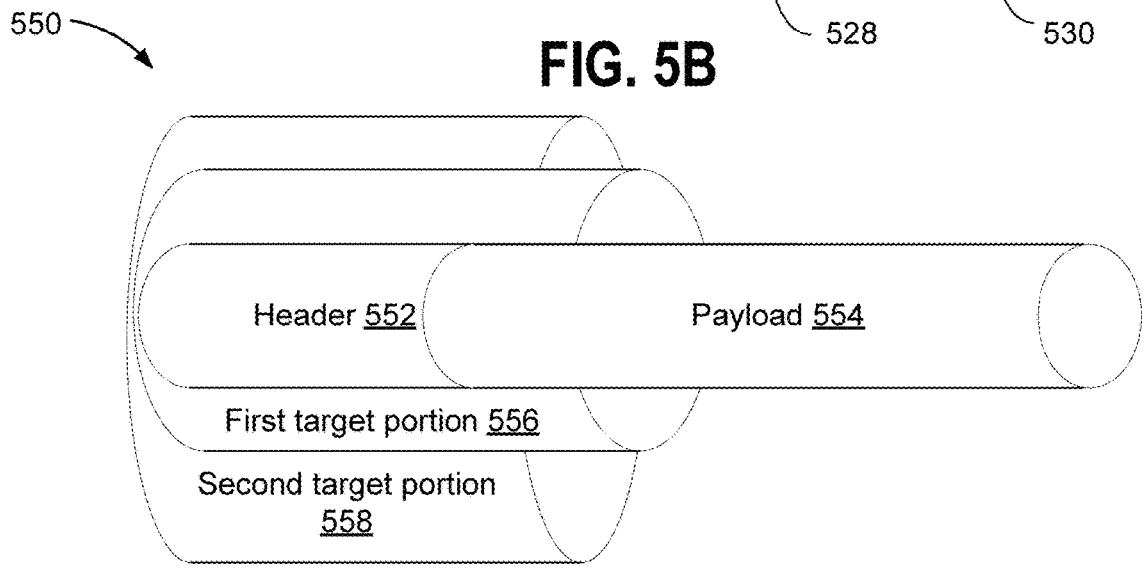

FIGS. 5A-5C illustrates example encryption schemes 500, 520, 550 for the improved encryption/decryption in accordance with various embodiments. The first example encryption scheme 500 illustrates a packet comprising a header 502 and a payload 504. A target portion 506 to be encrypted can include a header 502 and a portion of the payload 504. The payload 504 can be already encrypted according to an encryption algorithm, such as advanced encryption standard (AES), for example. The target portion 506 can be encrypted in the same encryption algorithm as the encryption algorithm that was used to encrypt the already encrypted payload 504 or a different encryption algorithm, such as triple DES (3DES).

The second example encryption scheme 520 illustrates additional encryption(s) for additional portion(s) of a payload 524 in addition to the first example encryption scheme 500. In addition to a first target portion 526 that can be encrypted, the second example encryption scheme 520 provides a second target portion 528 and a third target portion 530 that can be encrypted. The first target portion 526, the second target portion 528, and the third target portion 530 can be encrypted with the same encryption algorithm or different encryption algorithms. As an example, the first target portion 526, the second target portion 528, and the third target portion 530 can be encrypted with 3DES. As another example, the first target portion 526 can be encrypted with AES, the second target portion 528 encrypted with 3DES, and the third target portion 530 encrypted with DES. In some embodiments, one or more target portions 526, 528, 530 can be encrypted with the same encryption algorithm as an encryption algorithm used to encrypt the payload 524. The second example encryption scheme 520 depicts three target portions 526, 528, 530 but any number of target portions, including two, can be encrypted. Many variations are possible.

The third example encryption scheme 550 illustrates providing additional layer(s) of encryption for a header 552 and a portion of a payload 554. In the third example encryption scheme 550, a first target portion comprising the header 552 and a portion of the payload 554 are encrypted. As described above, the payload 554 can already be encrypted according to an encryption algorithm. A second target portion 558 that includes a portion of the first target portion 556 can further be encrypted according to the same encryption algorithm or an encryption algorithm different from an encryption algorithm used to encrypt the first target portion 556. In some embodiments, the second target portion 556 can be of smaller size (as shown), of the same size, or of greater size than the first target portion 556. The third example encryption scheme 550 depicts two additional layers of encryption but any number of additional layers may be added.

An encryption scheme selected, type(s) of encryption, target portion(s) encrypted, and/or encryption key(s) may be indicated by an IP option portion of a packet. For example, the IP option field 434 of FIG. 4 may provide such information. More details will follow with respect to IP option datagrams 600, 620, 640 of FIGS. 6A-6C below.

Figure 6A:
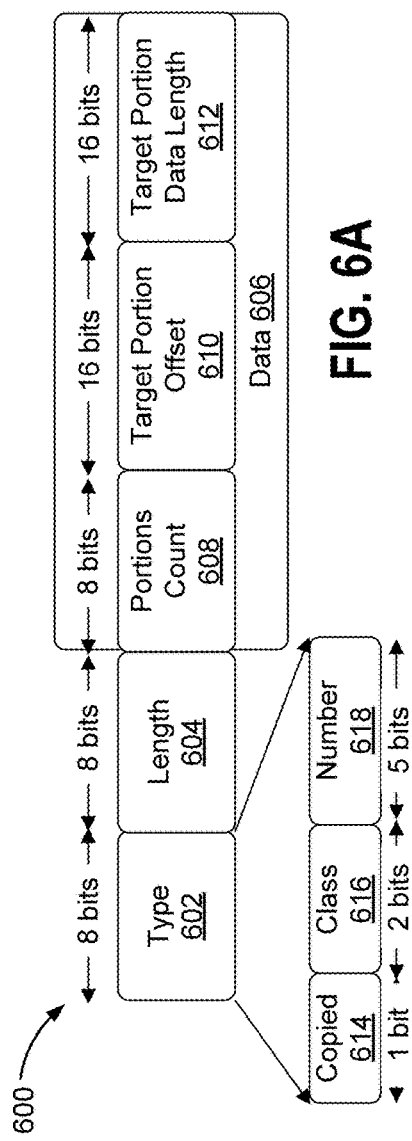
FIGS. 6A-6C illustrate example IP option datagrams for the improved encryption/decryption in accordance with various embodiments.
Figure 6B:
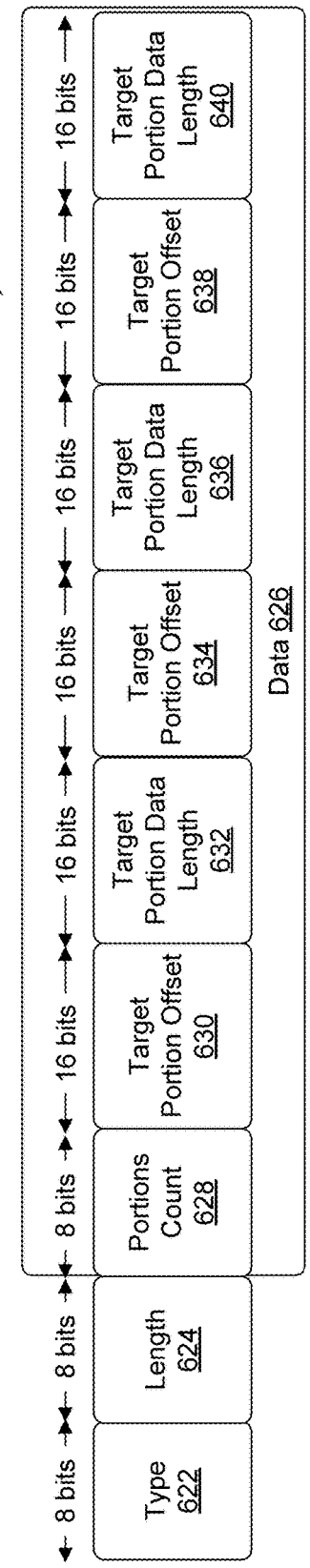
Figure 6C:
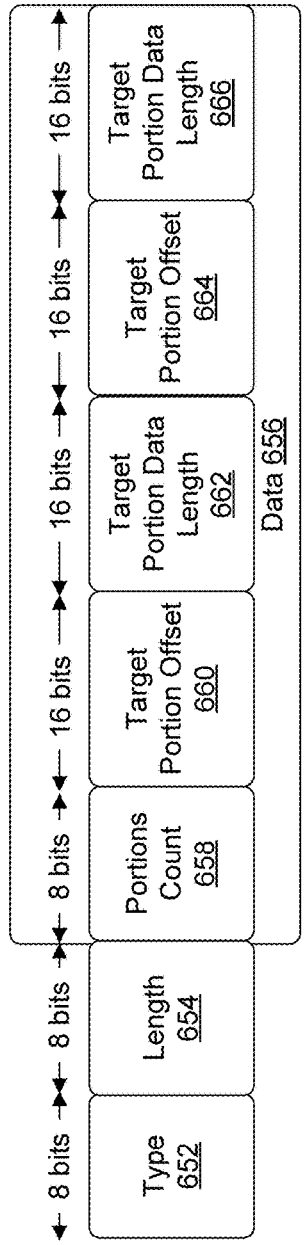

FIGS. 6A-6C illustrates example IP option datagrams 600, 620, 650 for the improved encryption/decryption in accordance with various embodiments. Specifically, the first example IP option datagram 600 can describe the first example encryption scheme 500 of FIG. 5A, the second example IP option datagram 620 can describe the second example encryption scheme 520 of FIG. 5B, and the third example IP option datagram 650 can describe the third example encryption scheme 550 of FIG. 5C. As the example IP option datagrams 600, 620, 650 illustrate, lengths of various fields can be predefined. The IP option datagrams 600, 620, 650 illustrate certain lengths (e.g., portions count fields 608, 628, 658 having 8 bit lengths, target portion offset fields 610, 630, 634, 638, 660, 664 having 16 bit lengths, etc.). It is contemplated that different predefined lengths can be used for each field. Further, in some embodiments, fields may have variable (dynamic) lengths.

As the first example IP option datagram 600 illustrates, an IP option datagram (e.g., the IP option field 434 of FIG. 4) typically includes three separate fields: type field 602, length field 604, and data field 606. The type field 602 is typically used to indicate a specific option in use, while the length field 604 is typically used to indicate the size of the IP option datagram (including all of the fields and data field 606 combined). The length field 604 can be used to inform a recipient of the IP option datagram 600 of where the data field 606 ends. The second example IP option diagram 620 can have respective type field 622, length field 624, and data field 626 and the third example IP option datagram 650 can have respective type field 652, length field 654, and data field 658.

According to IP provisions, a type field (e.g., the type fields 602, 622, 652) is typically an octet (i.e., 8 bits) sub-divided into a one bit copied flag 614, a two bit class field 616, and a five bit number field 618. The five bit number field 618 can indicate use of an improved encryption scheme, such as the example encryption schemes 500, 520, 550, by defining and using a new value for the five bit number field 618. For instance, any currently unused five bit number can indicate the use of the first example encryption scheme 500, another currently unused five bit number can indicate the use of the second example encryption scheme 520, and yet another currently unused five bit number can indicate the use of the third example encryption scheme 550.

As the first example IP option datagram 600 illustrates, the data field 606 can include a portions count field 608 that indicates how many encryption portions are applied to a packet. The first example IP option datagram 600 corresponds to the first example encryption scheme 500 of FIG. 5A that applies one level of encryption to a single target portion 506. Accordingly, the portions count field 608 reflects that a single encryption is applied. The data field 606 can further include two additional fields, a target portion offset field 610 and a target portion data length field 612, that can describe a location and a size of the target portion 506. The target portion offset field 610 can describe a starting location of the target portion 506. The target portion data length field 612 can describe a data length that describes a quantity of data contained in the target portion 506.

The second example IP option datagram 620 can correspond to the second example encryption scheme 520 of FIG. 5B. The second example encryption scheme 520 applies a single level of encryption to three different target portions: the first target portion 526, the second target portion 528, and the third target portion 530. Similar to the first example IP option datagram 600, the second example IP option datagram 620 can include a type field 622 with a five bit number field of the type field 622 that can indicate the use of the second example encryption scheme 520.

The data field 626 of the second example IP option datagram 620 can include a portions count field 628 that indicates how many encryption portions are applied to a packet. The portions count field 628 reflects that a single level of encryption is applied to the three target portions 526, 528, 530. Each target portion 526, 528, 530 can be associated with a respective set of a target portion offset and a target portion data length. For instance, the first target portion 526 can be described with a first target portion offset field 630 and a first target portion data length field 632. The second target portion 528 can be described with a second target portion offset field 634 and a second target portion data length field 636. The third target portion 530 can be described with a third target portion offset field 638 and the third target portion data length field 640. In some embodiments, the second example encryption scheme 520 of FIG. 5B can have fewer or more than the three target portions 526, 528, 530. In those embodiments, the portions count field 628 can be adjusted to reflect the fewer or additional target portions and fewer or additional set(s) of target portion offset field and target portion data length can be included in the data field 626.

The third example IP option datagram 650 can correspond to the third example encryption scheme 550 of FIG. 5C. The third example encryption scheme 550 applies a first level of encryption to the first target portion 556 and then a second level of encryption to the second target portion 558. Similar to the first example IP option datagram 600, the third example IP option datagram 650 can include a type field 652 with a five bit number field of the type field 652 that can indicate the use of the third example encryption scheme 550.

The data field 656 of the third example IP option datagram 650 can include a portions count field 658 that indicates how many levels of encryptions are applied to a packet. In the third example IP option datagram 650, the portions count field 658 can indicate two encryptions and, thus, two corresponding sets of target portion offset field and target portion data length. The first set can include a first target portion offset field 660 and a first target portion data length field 662. The second set can include a second target portion offset field 664 and a second target portion data length field 666.

The third example IP option datagram 650 can be structured such that the outer (i.e., top) level encryption is described with the first set before the inner (i.e., lower) level encryption is described with the second set in the third example IP option datagram 650. In some embodiments, the sets can be ordered in a different sequence, such as with an inner level before an outer level. The first set and the second set can indicate overlapping portion between the first target portion 556 and the second target portion 558 (e.g., the second target portion 558 includes at least a portion of the first target portion 556). In some embodiments, the third example encryption scheme 550 of FIG. 5C can have fewer or additional level(s) of encryptions. In those embodiments, portions count field 658 can be adjusted to reflect the fewer or additional target portions and fewer or additional set(s) of target portion offset field and target portion data length can be included in the data field 656.

The structures of the example IP option diagrams 600, 620, 650 are exemplary and not to be considered limiting. An encryption scheme combining one or more of the example encryption schemes 500, 520, 550 of FIGS. 5A-5C is contemplated. For example, an improved encryption scheme that simultaneously provides multiple encrypted target portions of the second example encryption scheme 520 in which some of the encrypted target portions are encrypted with multiple levels of the third example encryption scheme 550 is also contemplated.

Figure 7:
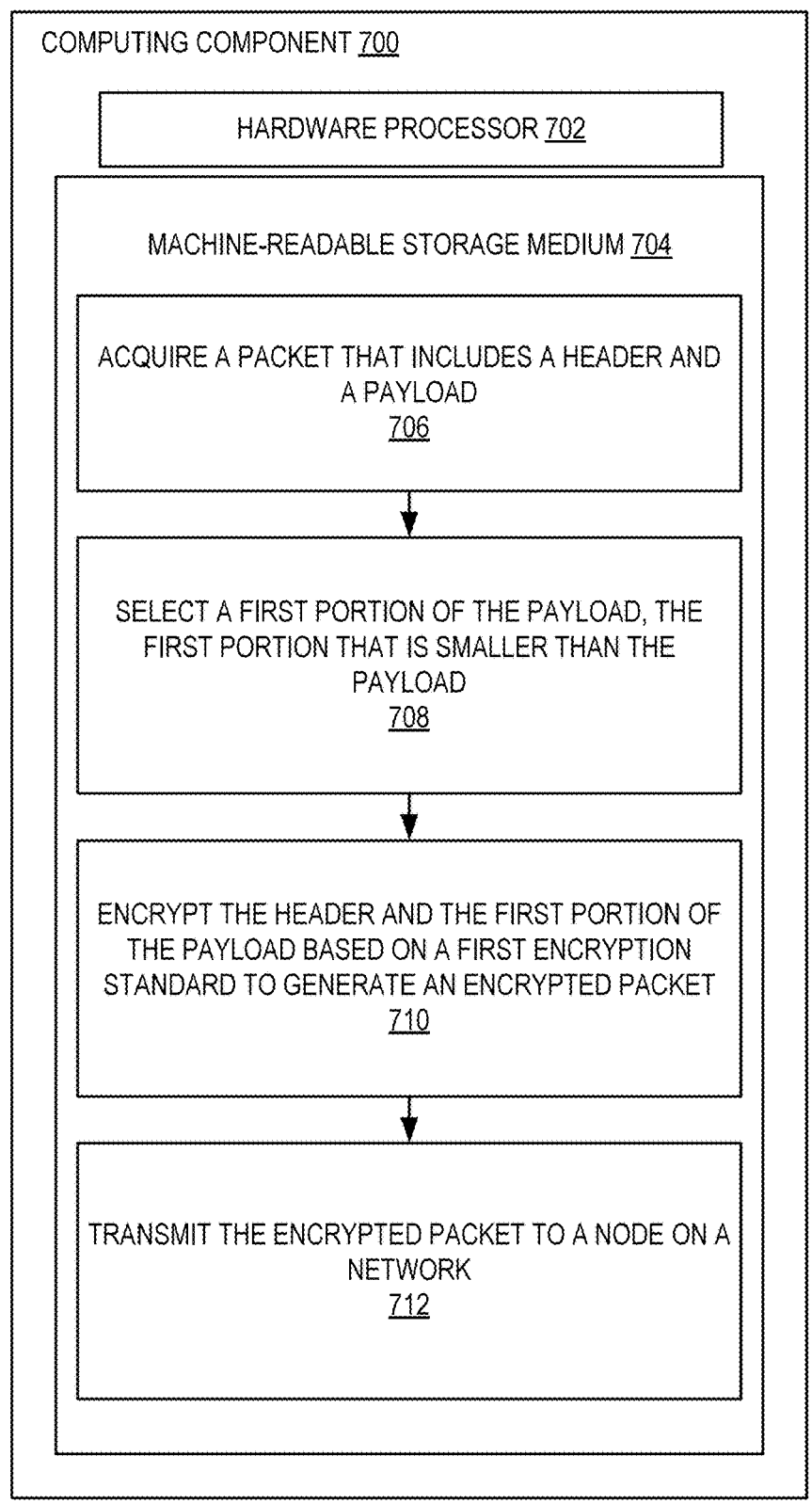
FIG. 7 depicts a set of executable instructions stored in machine-readable storage media that, when executed, cause one or more hardware processors to provide the improved encryption/decryption in accordance with various embodiments.

FIG. 7 depicts a set of executable instructions stored in machine-readable storage media that, when executed, cause one or more hardware processors to provide the improved encryption/decryption in accordance with various embodiments. Computing component 700 may be, for example, a server computer, a controller, or any other similar computing component capable of processing data. In the example implementation of FIG. 7, computing component 700 includes a hardware processor, 702, and machine-readable storage medium, 704. In some embodiments, computing component 700 may be an embodiment of a component of a network. The computing component 700 may be an AP (e.g., the AP 108 of FIG. 1), a controller (e.g., the controller 122 of FIG. 1) associated with a gateway (e.g., the gateway 106a of FIG. 1) or a cluster of gateways (e.g., the gateway cluster 104 of FIG. 1).

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-712, to control processes or operations for upgrading an AP. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 704 may be encoded with executable instructions, for example, instructions 706-712.

The hardware processor 702 may execute instruction 706 to acquire a packet that includes a header and a payload. The hardware processor 702 may execute instruction 708 to select a first portion of the payload. The selected portion can be smaller than the payload. The hardware processor 702 may execute instruction 710 to encrypt the header and the first portion of the payload based on a first encryption algorithm to generate an encrypted packet. The hardware processor 702 may execute instruction 712 to transmit the encrypted packet to a node on a network.

Figure 8:
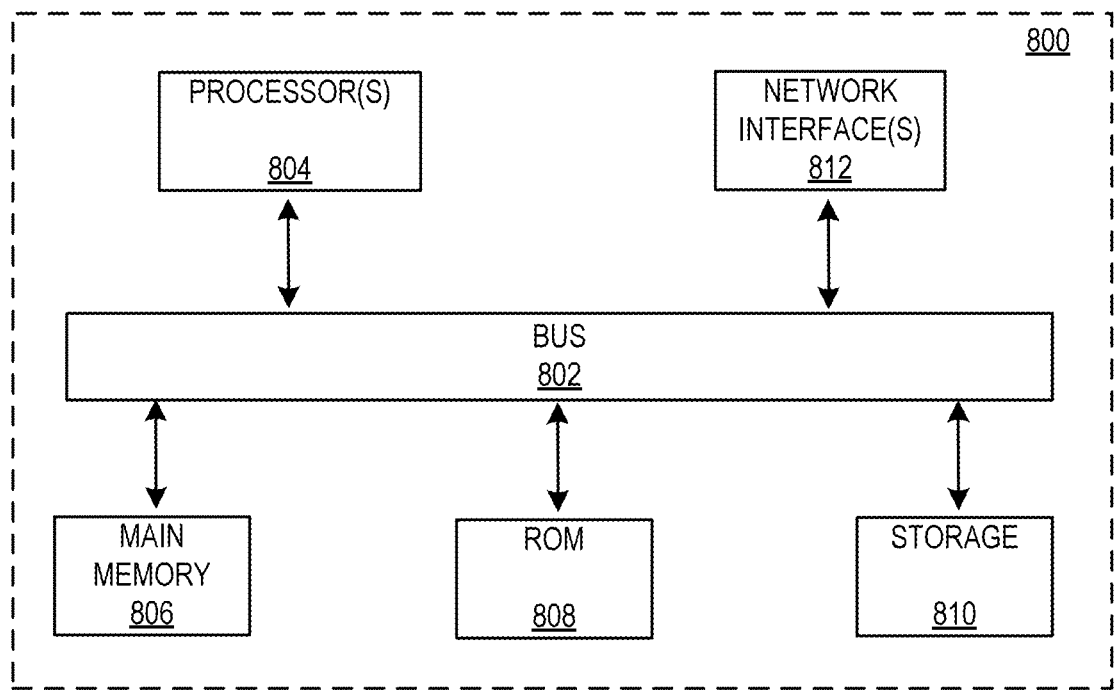
FIG. 8 illustrates an example computing component in which various embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may further include at least one network interface 812, such as a network interface controller (NIC), network adapter, or the like, or a combination thereof, coupled to bus 802 for connecting computer system 800 to at least one network.

In general, the word "module," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
  acquiring, by a computing system, a first packet that includes a header and a payload;
  processing, by the computing system, the first packet to provide an encrypted packet, wherein the processing comprises:
    selecting, by the computing system, a first portion of the payload, the first portion smaller than the payload;
    encrypting, by the computing system, the header and the first portion of the payload based on a first encryption algorithm;
    encrypting, by the computing system, a second portion of the payload other than the first portion based on a second encryption algorithm other than the first encryption algorithm; and
    encrypting, by the computing system, a third portion of the payload other than the first portion and the second portion based on a third encryption algorithm other than the first encryption algorithm and the second encryption algorithm; and
  transmitting, by the computing system, the encrypted packet to a node on a network.

2. The computer-implemented method of claim 1, wherein the second portion is less than the payload in an entirety, excludes the first portion, and is not adjacent to the first portion.

3. The computer-implemented method of claim 1, wherein the encrypting the header and the portion of the payload is according to fields in an Internet Protocol (IP) Option field of the payload, the fields including at least a target portion offset field and a target portion data length field.

4. The computer-implemented method of claim 1, further comprising:
generating, by the computing system, a tunnel between the node and an access point.

5. The computer-implemented method of claim 1, further comprising:
determining, by the computing system, that the payload is encrypted.

6. The computer-implemented method of claim 5, further comprising:
determining, by the computing system, a level of security associated with the second encryption algorithm; and
selecting, by the computing system, the first encryption algorithm based on the level of security associated with the second encryption algorithm.

7. The computer-implemented method of claim 5, wherein the determining that the payload is encrypted further comprises:
determining, by the computing system, that the payload is encrypted using at least one of Temporal Key Integrity Protocol (TKIP) or advanced encryption standard (AES).

8. A system comprising:
at least one processor; and
a memory storing instructions that, when executed by the at least one processor, cause the system to perform a method comprising:
acquiring a first packet that includes a header and a payload;
processing the first packet to provide an encrypted packet, wherein the processing comprises:
selecting a first portion of the payload, the first portion smaller than the payload; and
encrypting the header and the first portion of the payload based on a first encryption algorithm;
encrypting a second portion of the payload other than the first portion based on a second encryption algorithm other than the first encryption algorithm; and
encrypting a third portion of the payload other than the first portion and the second portion based on a third encryption algorithm other than the first encryption algorithm and the second encryption algorithm; and
transmitting the encrypted packet to a node on a network.

9. The system of claim 8, wherein the second portion is less than the payload in an entirety, excludes the first portion, and is not adjacent to the first portion.

10. The system of claim 8, wherein the second encryption algorithm is different from the first encryption algorithm encrypting the first portion and different from a third encryption algorithm encrypting the payload.

11. A non-transitory computer-readable storage medium including instructions that, when executed by at least one processor of a computing system, cause the computing system to perform a method comprising:
acquiring a first packet that includes a header and a payload;
processing the first packet to provide an encrypted packet, wherein the processing comprises:
selecting a first portion of the payload, the first portion smaller than the payload; and
encrypting the header and the first portion of the payload based on a first encryption algorithm;
encrypting a second portion of the payload other than the first portion based on a second encryption algorithm other than the first encryption algorithm; and
encrypting a third portion of the payload other than the first portion and the second portion based on a third encryption algorithm other than the first encryption algorithm and the second encryption algorithm; and
transmitting the encrypted packet to a node on a network.

12. The non-transitory computer-readable storage medium of claim 11, wherein the second portion is less than the payload in an entirety, excludes the first portion, and is not adjacent to the first portion.

\* \* \* \* \*